(12) United States Patent
Egawa

(10) Patent No.: US 7,729,042 B2
(45) Date of Patent: Jun. 1, 2010

(54) LIGHT SOURCE DEVICE, LIGHTING DEVICE, AND IMAGE DISPLAY APPARATUS

(75) Inventor: Akira Egawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/350,336

(22) Filed: Jan. 8, 2009

(65) Prior Publication Data

US 2009/0174929 A1   Jul. 9, 2009

(30) Foreign Application Priority Data

Jan. 9, 2008   (JP)   ............................... 2008-001866

(51) Int. Cl.
  *G02F 1/35*   (2006.01)
  *H01S 3/10*   (2006.01)
(52) U.S. Cl. ........................... 359/326; 372/21; 372/22; 372/36
(58) Field of Classification Search ......... 359/326–332; 372/21–22, 32, 34, 36
  See application file for complete search history.

(56) References Cited

U.S. PATENT DOCUMENTS 5,854,802 A * 12/1998 Jin et al. ........................ 372/22
6,002,696 A * 12/1999 Ohishi et al. ................... 372/22
6,072,815 A * 6/2000 Peterson ....................... 372/36
6,130,901 A * 10/2000 Takamine et al. .............. 372/32
6,532,100 B1 * 3/2003 Partanen et al. .............. 359/326

FOREIGN PATENT DOCUMENTS

JP   2001-168422   6/2001

OTHER PUBLICATIONS

Aram Mooradian et al, "High Power Extended Vertical Cavity Surface Emitting Diode Lasers and Arrays and Their Applications", Micro-Optics Conference, Tokyo Japan, Nov. 2, 2005.

* cited by examiner

*Primary Examiner*—Hemang Sanghavi
(74) *Attorney, Agent, or Firm*—Workman Nydegger

(57) ABSTRACT

A light source device includes: a light source unit configured to emit light; a wavelength conversion element configured to convert the wavelength of light emitted from the light source unit; a light source housing configured to accommodate at least the light source unit and the wavelength conversion element; and a temperature control unit configured to control temperature of the wavelength conversion element. The temperature control unit is disposed outside the light source housing.

6 Claims, 4 Drawing Sheets

LIGHT SOURCE DEVICE, LIGHTING DEVICE, AND IMAGE DISPLAY APPARATUS

BACKGROUND

1. Technical Field

The present invention relates to a light source device, a lighting device, and an image display apparatus, and more particularly to a technology of a light source device which emits laser beams.

2. Related Art

Recently, a technology of a laser beam source as a light source device included in an image display apparatus such as a projector has been proposed. The laser beam source has been developed as a light source of the projector with increase in output power and color multiplication. When compared with a UHP lamp currently used as the light source device of the projector, the laser beam source has advantages such as compactness, high color reproducibility, immediate lighting, and long life. For example, JP-A-2001-168422 proposes a technology of a laser device which contains a resonator for resonating light in a package.

Regarding the device emitting laser beams, measures are taken to prevent possible problems caused by laser beams such as damages to human eyes when laser beams directly enter the eyes. The device including the laser beam source is required not only to cause no problem as long as the device is used appropriately, but also to prevent use of the laser beam source taken out by persons having no knowledge of laser or the like for making bad use of the laser beam source or for using the laser beam source for other purpose. According to the structure disclosed in JP-A-2001-168422, there is a possibility that high-power laser beams are emitted out of the package by supply of power when the laser device accommodated in the package is taken out. Thus, problems of making bad use of the laser beam source and using the laser beam source for other purposes may be caused when the laser beam source accommodated in the package is taken out.

SUMMARY

It is an advantage of some aspects of the invention to provide a light source device capable of sufficiently reducing the possibility of making bad use of the light source device and using the light source device for other purpose, and to provide a lighting device and an image display apparatus including the light source device.

A light source device according to a first aspect of the invention includes: a light source unit configured to emit light; a wavelength conversion element configured to convert the wavelength of light emitted from the light source unit; a light source housing configured to accommodate at least the light source unit and the wavelength conversion element; and a temperature control unit configured to control temperature of the wavelength conversion element. The temperature control unit is disposed outside the light source housing.

It is known that the wavelength conversion efficiency of the wavelength conversion element lowers by collapse of phase matching condition when refractive index distribution varies according to temperature change. When the main body having the light source housing is separated from the temperature control unit, conduction of heat between the temperature control unit and the wavelength conversion element is cut off. As a result, temperature control of the wavelength conversion element stops. By stopping the temperature control of the wavelength conversion element, the wavelength conversion efficiency of the wavelength conversion element decreases. The decrease in the wavelength conversion efficiency reduces light emission from the main body, and thus sufficiently lowers the possibility of making bad use of the light source device and using the light source device for other purpose. Accordingly, the light source device can sufficiently achieve reduction of the possibility of making bad use of the light source device and using the light source device for other purpose.

It is preferable that the temperature control unit is disposed on a light source fixing member which fixes the light source housing in the light source device. When the main body is fixed to the light source fixing member, temperature of the wavelength conversion element can be controlled by heat conduction between the temperature control unit and the wavelength conversion element. When the main body is removed from the light source fixing member, temperature control of the wavelength conversion element is stopped by removal of the main body from the temperature control unit. Thus, light emission from the main body can be decreased by removal of the main body from the light source fixing member.

It is preferable that the light source device further includes a heat conductive member disposed at the position of the wavelength conversion element on the light source housing to conduct heat between the wavelength conversion element and the temperature control unit. According to this structure, the temperature of the wavelength conversion element can be controlled by the temperature control unit.

It is preferable that the light source device further includes a heat insulator provided around the heat conductive member to reduce conduction of heat. According to this structure, conduction of heat from the temperature control unit to the light source housing is reduced, and thus the temperature of the wavelength conversion element can be efficiently controlled.

It is preferable that the light source unit is configured to emit light having first wavelength in the light source device. In this case, the wavelength conversion element is configured to convert the wavelength of the light having the first wavelength into light having second wavelength different from the first wavelength and emits the light having the second wavelength. Also, a wavelength selecting unit is configured to direct the light having the second wavelength to the outside of the light source housing, and reduces the light having the first wavelength and traveling to the outside of the light source housing. During temperature control of the wavelength conversion element, the second wavelength light is emitted from the main body, and emission of the first wavelength light is decreased. When the temperature control of the wavelength conversion element is stopped, emission of the first wavelength light from the main body can be similarly reduced.

It is preferable that the light source device further includes an external resonator configured to resonate light emitted from the light source unit. In this case, the temperature control unit is configured to control temperature of the external resonator. Light emitted from the light source unit is efficiently resonated by temperature control of the external resonator. Thus, the light source device can emit light with higher efficiency.

A lighting device according to a second aspect of the invention includes the light source device described above to illuminate a light receiving object by light emitted from the light source device. The lighting device having this structure can sufficiently achieve reduction in the possibility of making bad use of the light source device and using the light source device for other purpose.

An image display apparatus according to a third aspect of the invention includes the light source device described above to display an image by light emitted from the light source device. The image display apparatus having this structure can sufficiently achieve reduction in the possibility of making bad use of the light source device and using the light source device for other purpose.

BRIEF DESCRIPTION OF THE DRAWINGS

The invention will be described with reference to the accompanying drawings, wherein like numbers reference like elements.

DESCRIPTION OF EXEMPLARY EMBODIMENTS

Exemplary embodiments according to the invention are now described in detail with reference to the drawings.

First Embodiment

Figure 1:
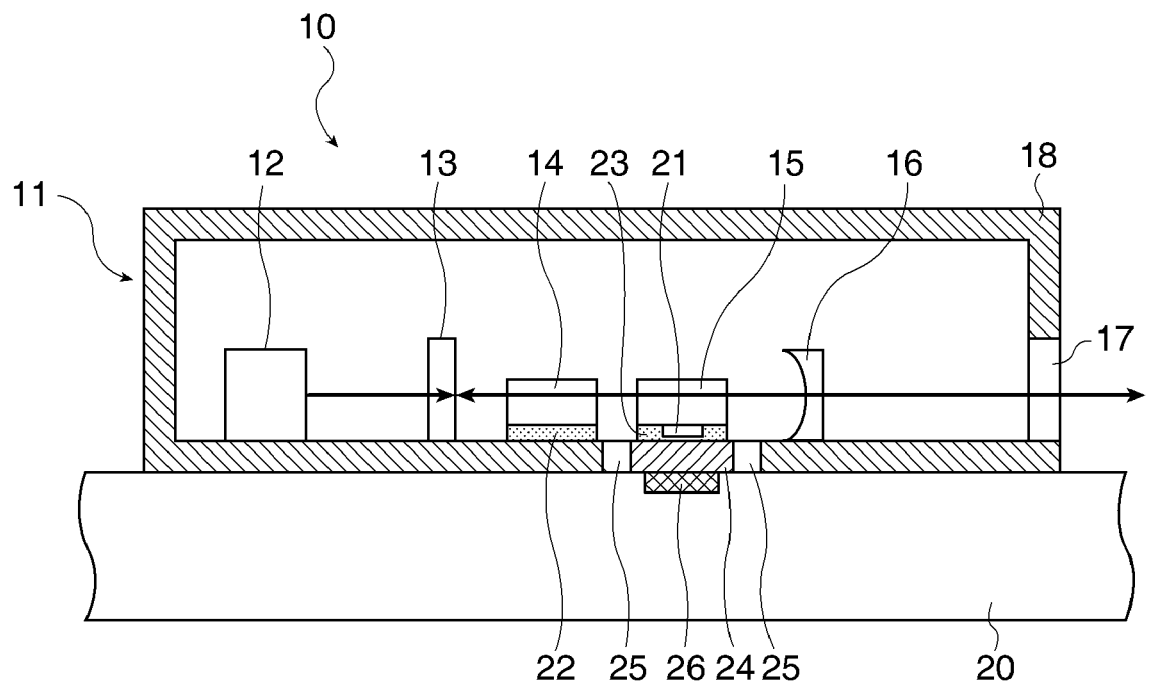
FIG. 1 schematically illustrates a light source unit as a light source device according to a first embodiment of the invention.

FIG. 1 schematically illustrates a light source unit 10 as a light source device according to a first embodiment of the invention. The light source unit 10 has a main body 11 and a heater 26. The main body 11 is mounted on a light source fixing member 20. The main body 11 has a light source housing 18, respective components contained in the light source housing 18, and a filter 17.

The light source unit 10 constitutes semiconductor laser exciting solid (diode pumped solid state; DPSS) laser generator. An exciting semiconductor element 12 emits light having wavelength of 808 nm, for example. The exciting semiconductor element 12 may be either an end-surface light emission type semiconductor element or a surface light emission type semiconductor element. A first resonator mirror 13 is disposed at a position for receiving light emitted from the exciting semiconductor element 12. A laser crystal 14 is disposed at a position for receiving light having traveled from the exciting semiconductor element 12 through the first resonator mirror 13. The laser crystal 14 is excited by light released from the exciting semiconductor element 12 to emit fundamental light having first wavelength. The laser crystal 14 may be Nd:YVO$_4$ crystal or Nd:YAG(Y$_3$Al$_5$O$_{12}$) crystal, for example. The exciting semiconductor element 12 and the laser crystal 14 function as a light source unit for emitting the fundamental light having the first wavelength. The first wavelength fundamental light is infrared light, for example. The first wavelength is 1,064 nm, for example.

A second harmonic generation (SHG) element 15 is disposed at a position for receiving the first wavelength fundamental light emitted from the laser crystal 14. The SHG element 15 emits higher harmonic light having second wavelength different from the first wavelength by converting the wavelength of the fundamental light having the first wavelength. The SHG element 15 is a wavelength conversion element for converting the wavelength of light emitted from the laser crystal 14. The second wavelength light is visible light, for example. The second wavelength is half of the first wavelength such as 532 nm. The SHG element 15 is polarization-inverted crystal of lithium niobate (periodically poled lithium niobate; PPLN) as non-linear optical crystal. According to the structure including the SHG element 15, laser beam having desired wavelength and sufficient light amount can be supplied by using a general-purpose light source easily available.

A second resonator mirror 16 is disposed at a position for receiving light having traveled from the laser crystal 14 through the SHG element 15. The second resonator mirror 16 selectively reflects the first wavelength light and transmits light having wide wavelength range including the second wavelength. The first resonator mirror 13 selectively reflects the first wavelength light and transmits light other than the first wavelength light similarly to the second resonator mirror 16. The fundamental light reflected by the first resonator mirror 13 and the second resonator mirror 16 is amplified by resonance with fundamental light emitted next from the laser crystal 14.

The light source housing 18 accommodates the components for generating laser beams as a housing for releasing laser beams as higher harmonic light out of the housing. The light source housing 18 contains the respective components provided on the optical path from the exciting semiconductor element 12 to the second resonator mirror 16, and closes the interior of the housing. The respective components from the exciting semiconductor element 12 to the second resonator mirror 16 are positioned relative to one another within the light source housing 18. The laser crystal 14 and the SHG element 15 are disposed on a laser crystal fixing member 22 and an SHG element fixing member 23, respectively, so as to be appropriately positioned relative to other components. The laser crystal fixing member 22 and the SHG element fixing member 23 are plate-shaped members. A thermister 21 is disposed on the SHG element fixing member 23. The thermister 21 is a temperature measuring member for measuring the temperature of the SHG element 15.

A filter 17 is disposed at a position for receiving light having passed through the second resonator mirror 16 in the light source housing 18. The filter 17 is provided in such a manner as to completely close an opening formed on the light source housing 18. The filter 17 reflects or absorbs infrared light, and transmits visible light. The filter 17 transmits higher harmonic light released from the second resonator mirror 16 and directs the light toward the outside of the light source housing 18. The filter 17 reflects or absorbs fundamental light from the second resonator mirror 16 to reduce fundamental light traveling to the outside of the light source housing 18. The filter 17 functions as a wavelength selecting member for directing the second wavelength higher harmonic light to the outside of the light source housing 18 and reduces the first wavelength fundamental light traveling to the outside of the light source housing 18. The filter 17 is produced by forming dielectric multilayer film which reflects or absorbs infrared light on transparent material such as glass.

The SHG element 15 emits higher harmonic light by converting the wavelength of fundamental light released from the laser crystal 14, and simultaneously emits fundamental light whose wavelength has not been converted. It is difficult to reflect all the fundamental light entering the second resonator mirror 16 from the SHG element 15 by the second resonator mirror 16, and thus a part of the fundamental light passes through the second resonator mirror 16 with higher harmonic light. By providing the filter 17, release of higher harmonic light from the main body 11 and reduction of fundamental light released from the main body 11 can be both achieved. Moreover, a not-shown anti-reflection film (AR film) for reducing reflection of visible light is provided on the surface of the filter 17 on the inner side of the light source housing 18. The AR film can reduce decrease in transmission rate of higher harmonic light at the filter 17. The filter 17 is produced by forming dielectric multilayer film on transparent material, or adding material for absorbing infrared light to glass composition.

A heat conductive member 24 is disposed at the same position as that of the SHG element 15 via the SHG element fixing member 23 in the light source housing 18. The heat conductive member 24 conducts heat between the SHG element 15 and the heater 26. The heat conductive member 24 is constituted by material having high heat conductivity such as copper. A heat insulator 25 is provided around the heat conductive member 24. The heat insulator 25 reduces conduction of heat from the heat conductive member 24 to the light source housing 18. The heat insulator 25 is constituted by heat insulating material such as resin.

The heater 26 is disposed outside the light source housing 18 and on the light source fixing member 20. The light source fixing member 20 is constituted by a part of a projector housing on which the light source unit 10 is provided. The light source fixing member 20 fixes the light source housing 18. The heater 26 functions as a temperature control unit for controlling the temperature of the SHG element 15 by supplying heat to the SHG element 15. The heater 26 is constituted by an electric heater, for example. Since the set temperature of the SHG element 15 is generally higher than the environmental temperature, the temperature of the SHG element 15 can be controlled by using only the heater 26 for supplying heat to the SHG element 15.

Figure 2:
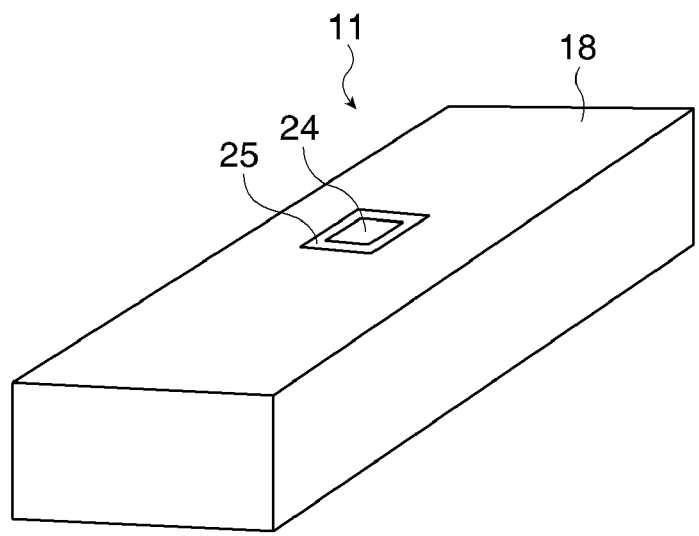
FIG. 2 is a perspective view showing a main body.

FIG. 2 is a perspective view showing the structure of the main body 11 including the surface connected with the light source fixing member 20. The heat conductive member 24 is provided at the position opposed to the heater 26 on the surface connected with the light source fixing member 20. By fixing the main body 11 to the light source fixing member 20, the heat conductive member 24 comes into contact with the heater 26. The contact between the heat conductive member 24 and the heater 26 allows heat to be conducted from the heater 26 to the SHG element 15. By this method, the temperature of the SHG element 15 can be controlled by the heater 26. The plan structure of the heat conductive member 24 is not limited to that shown in the figure, but may be changed in an appropriate manner.

The heat insulator 25 surrounds the periphery of the heat conductive member 24 on the surface of the main body 11 connected with the light source fixing member 20. The insulator 25 reduces conduction of heat from the heater 26 to the light source housing 18 such that the temperature of the SHG element 15 can be efficiently controlled. Moreover, the heat insulator 25 can reduce conduction of heat to the parts of the main body 11 other than the SHG element 15. For example, for cooling the exciting semiconductor element 12, the heat insulator 25 can reduce conduction of heat from the heater 26 through the light source housing 18 to the exciting semiconductor element 12 so as to efficiently cool the exciting semiconductor element 12.

Figure 3:
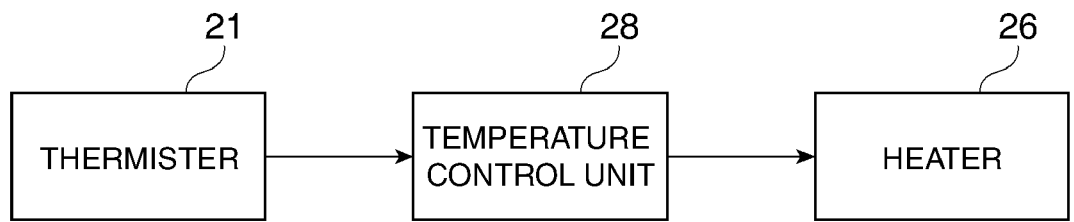
FIG. 3 is a block diagram showing a structure for controlling the temperature of an SHG element.

FIG. 3 is a block diagram showing the structure for controlling the temperature of the SHG element 15 based on the measurement result obtained by the thermister 21. The thermister 21 outputs temperature changes of the SHG element 15 to a temperature control unit 28 as variations in resistance. The temperature control unit 28 calculates the amount of power to be supplied to the heater 26 based on the temperature difference between the temperature measured by the thermister 21 and the set temperature of the SHG element 15, and supplies power corresponding to the calculated amount of power to the heater 26. The temperature control unit 28 provides feedback control over the heater 26 based on the measurement result obtained by the thermister 21.

While the main body 11 is fixed to the light source fixing member 20, the temperature of the SHG element 15 can be controlled by the heat conduction between the heater 26 and the SHG element 15. When the temperature of the SHG element 15 is adjusted to a predetermined set temperature by the heater 26, the light source unit 10 emits laser beam as higher harmonic light. When the main body 11 is removed from the light source fixing member 20, heat conduction between the heater 26 and the SHG element 15 is cut off by separation of the main body 11 from the heater 26. By the cut of heat conduction from the heater 26, the temperature control of the SHG element 15 stops.

When the temperature of the SHG element 15 lowers by the stop of the temperature control, the wavelength conversion efficiency of the SHG element 15 considerably decreases. The decrease in the wavelength conversion efficiency reduces emission of higher harmonic light from the SHG element 15, and thus reduces emission of laser beam from the main body 11. Moreover, emission of fundamental light from the main body 11 not receiving wavelength conversion by the SHG element 15 and thus transmitted through the SHG element 15 can be reduced by reflection or absorption by the filter 17. Accordingly, when the main body 11 having the light source housing 18 is removed from the device incorporating the light source unit 10, emission of light from the main body 11 is reduced such that the possibility of making bad use of the main body 11 or using the main body 11 for other purpose can be sufficiently reduced. As a result, sufficient reduction of the possibility of making bad use of the main body 11 or using the main body 11 for other purpose can be achieved. The temperature control unit may be constituted by Peltier element, thin-film resistor, or other element in place of the heater 26.

Second Embodiment

Figure 4:
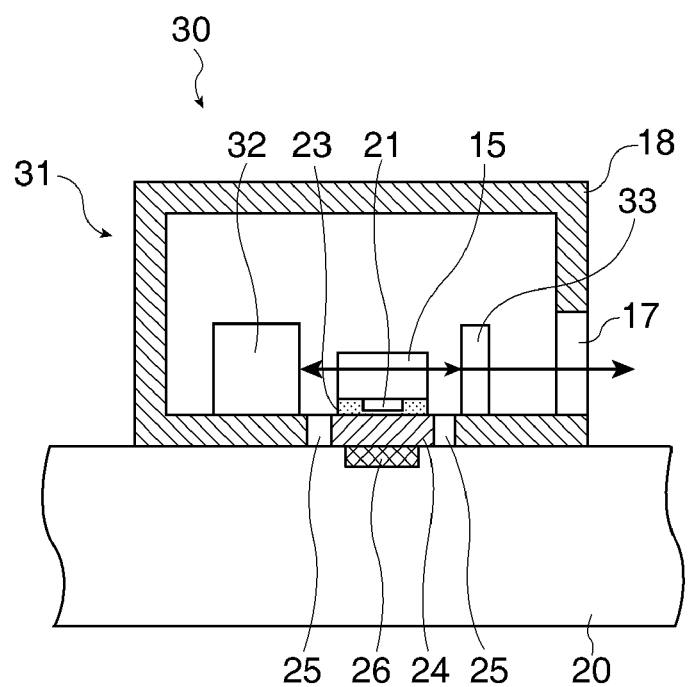
FIG. 4 schematically illustrates a light source unit as a light source device according to a second embodiment of the invention.

FIG. 4 schematically illustrates a light source unit 30 as a light source device according to a second embodiment of the invention. The light source unit 30 in this embodiment has an external resonator 33 provided on a main body 31. Similar reference numbers are given to parts similar to those in the first embodiment, and the same explanation is not repeated. A semiconductor element 32 is a light source unit for emitting fundamental light having the first wavelength. The semiconductor element 32 is a surface light emission type semiconductor element, for example. The semiconductor element 32 has a not-shown mirror layer for reflecting first wavelength fundamental light.

The SHG element 15 is disposed at a position receiving first wavelength fundamental light emitted from the semiconductor element 32. The external resonator 33 is disposed at a position receiving light having traveled from the semiconductor element 32 through the SHG element 15. The external resonator 33 is a narrow-band reflection mirror having such reflection characteristics that provide half width of several nm or smaller around the first wavelength in the infrared range. The external resonator 33 transmits light having wide wavelength range including the wavelength of higher harmonic light in the visible light range. The fundamental light reflected by the external resonator 33 and the mirror layer of the semiconductor element 32 is amplified by resonance with fundamental light emitted from the semiconductor element 32 next.

The external resonator 33 is constituted by volume hologram which reflects light by diffraction such as VHG (volume holographic grating). The VHG is formed by photo-refractive crystal such as $LiNbO_3$ and BGO, polymer, or the like. The VHG records interference strips generated by light entering in two directions. The interference stripes are recorded as periodic structure containing high refractive index parts and low refractive index parts each part of which is periodically arranged. The VHG selectively reflects only light having Bragg condition suited for interference strips by diffraction.

The light source housing 18 is a housing which accommodates the components for generating laser beam, and releases generated laser beam to the outside. The light source housing 18 accommodates the respective parts provided on the optical path from the semiconductor element 32 to the external resonator 33 and closes the interior. In this embodiment, the possibility of making bad use of the light source unit 30 and using the light source unit 30 for other purpose can be sufficiently reduced similarly to the first embodiment.

Figure 5:
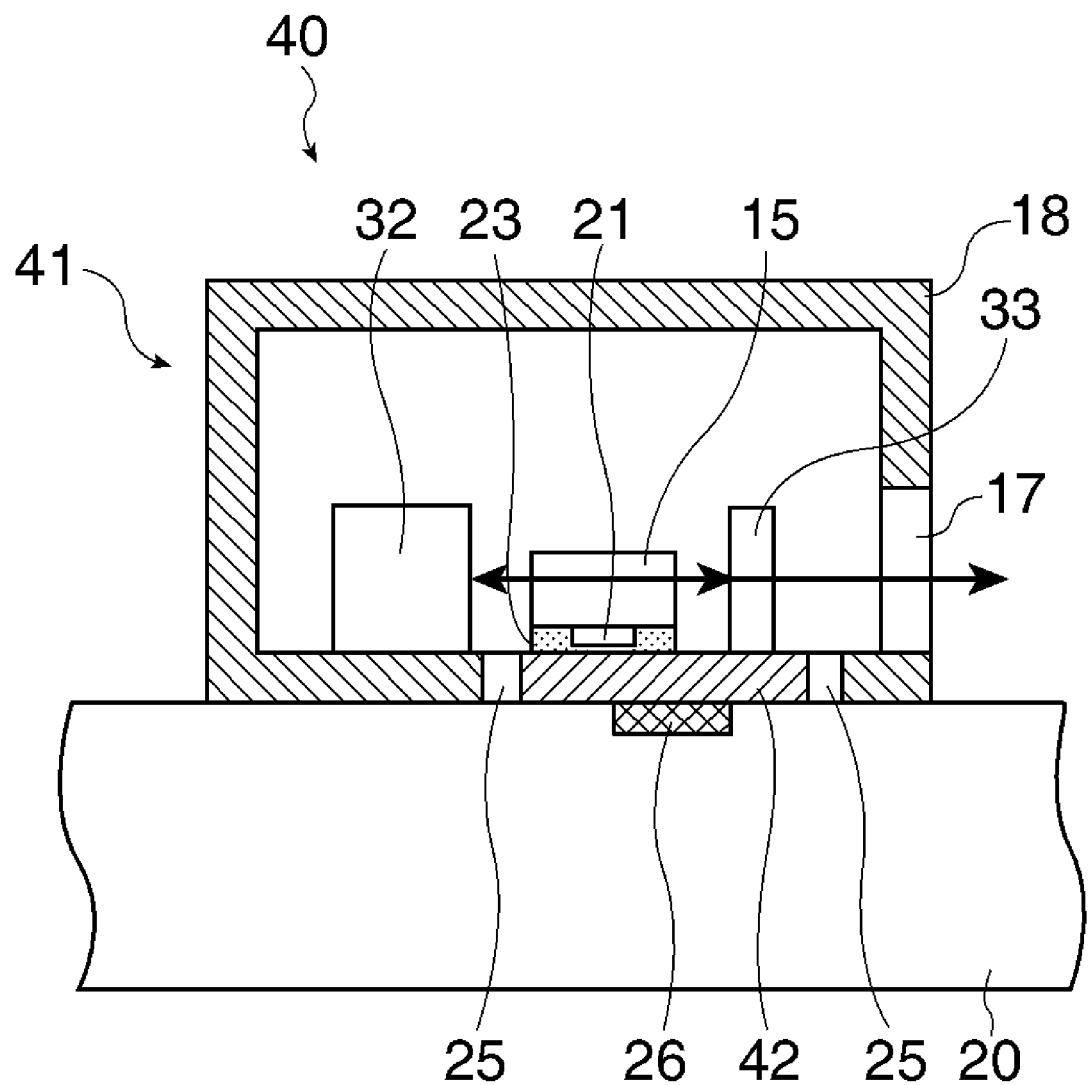
FIG. 5 schematically illustrates a light source unit as a light source device according to a modified example of the second embodiment of the invention.

FIG. 5 schematically illustrates a light source unit 40 as a light source device according to a modified example of this embodiment. In this modified example, the temperatures of the SHG element 15 and the external resonator 33 are controlled by using the heater 26. A heat conductive member 42 is provided on the light source housing 18 in the area from the position of the SHG element 15 provided via the SHG element fixing member 23 to the position of the external resonator 33. The heat conductive member 42 conducts heat between the SHG element 15 and the heater 26 and between the external resonator 33 and the heater 26. The heat conductive member 42 is formed by material having high heat conductivity such as copper. The heat insulator 25 is provided around the heat conductive member 42.

By fixing a main body 41 to the light source fixing member 20, the heat conductive member 42 comes into contact with the heater 26. The contact between the heat conductive member 42 and the heater 26 allows heat to be conducted from the heater 26 to the SHG element 15 and the external resonator 33. By this method, the temperatures of the SHG element 15 and the external resonator 33 can be controlled by the heater 26.

The wavelength of light selectively reflected by the external resonator 33 varies according to the temperature of the external resonator 33. By controlling the temperature of the external resonator 33 using the heater 26, light emitted from the semiconductor element 32 can be efficiently resonated. By this method, the light source unit 40 can emit laser beam with higher efficiency. The external resonator 33 may be controlled by using a temperature control unit equipped separately from the heater 26 provided for controlling the temperature of the SHG element 15. Also, a heat conductive member provided for the external resonator 33 may be equipped separately from the heat conductive member 42 provided for the SHG element 15. The temperature of the external resonator 33 may be controlled based on the measurement result obtained by a temperature measuring unit for measuring the temperature of the external resonator 33.

Third Embodiment

Figure 6:
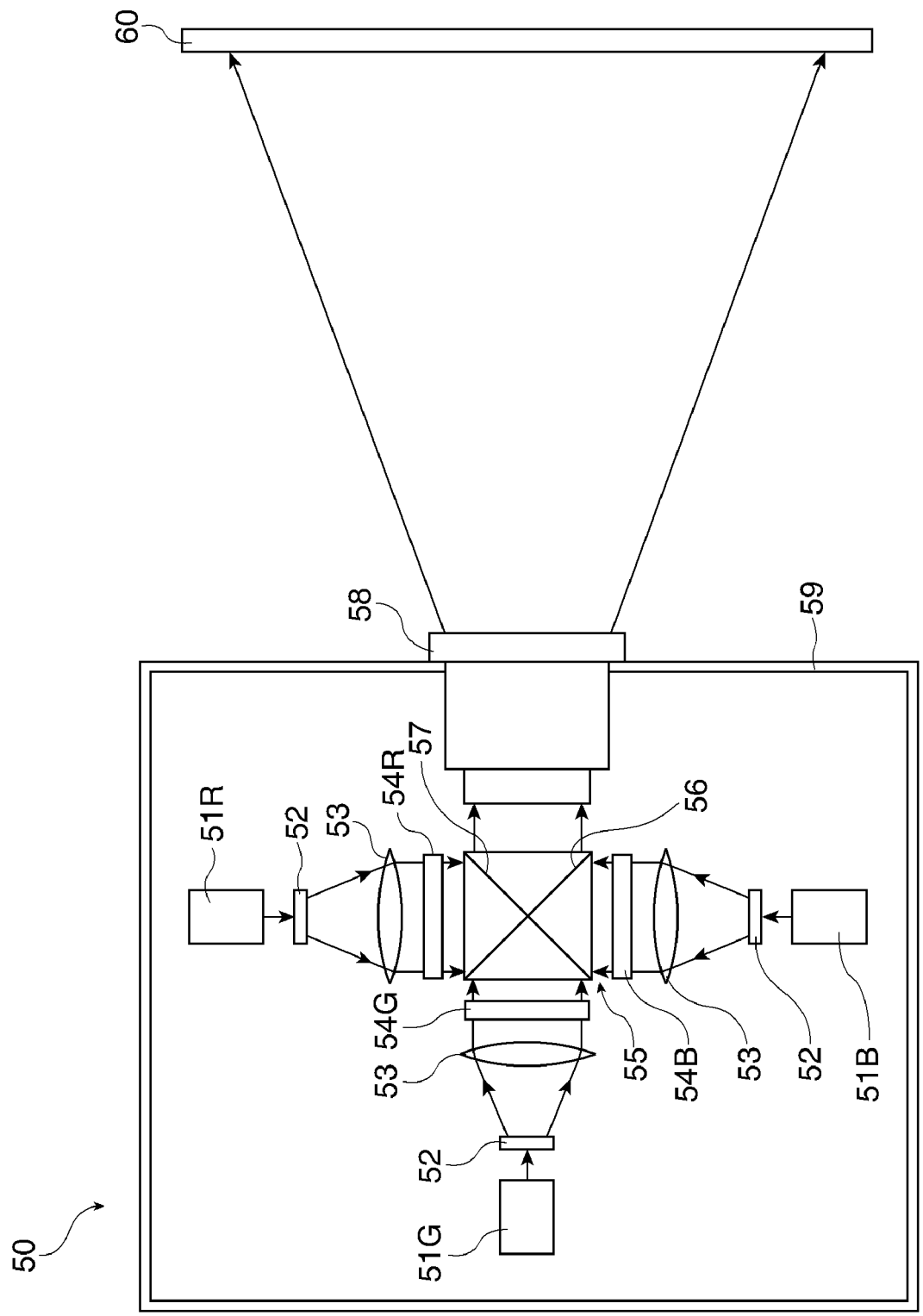
FIG. 6 schematically illustrates a projector according to a third embodiment.

FIG. 6 schematically illustrates a structure of a projector 50 as an image display apparatus according to a third embodiment of the invention. The projector 50 is a front projection type projector which projects light to a screen 60 to form images to be viewed by the light reflected by the screen 60.

The projector 50 includes a red (R) light source unit 51R, a green (G) light source unit 51G, and a blue (B) light source unit 51B. The respective color light source units 51R, 51G, and 51B have structures similar to that of the light source unit 10 in the first embodiment (see FIG. 1). The projector 50 is an image display apparatus which displays images using light emitted from the respective color light source units 51R, 51G, and 51B. The light source units 51R, 51G, and 51B are fixed to the inner surface of a projector housing 59. The projector housing 59 is a housing for accommodating the components for emitting light according to image signals. The projector housing 59 accommodates the respective parts provided on the optical path from the respective color light source units 51R, 51G, and 51B to a cross dichroic prism 55. A projection lens 58 is disposed on the projector housing 59.

The R light source unit 51R is a light source device for emitting R light. A not-shown heater of the R light source unit 51R as a temperature control unit is provided in the projector housing 59. A diffusing element 52 shapes and enlarges the illumination area, and equalizes the light amount distribution in the illumination area. The diffusing element 52 is constituted by computer generated hologram (CGH) as a diffraction optical element, for example. A field lens 53 collimates light emitted from the R light source unit 51R and directs the collimated light toward an R spatial light modulating device 54R. The R light source unit 51R, the diffusing element 52, and the field lens 53 constitute a lighting device for supplying light to the R spatial light modulating device 54R. The R spatial light modulating device 54R is a spatial light modulating device, a transmission type liquid crystal display device for modulating R light emitted from the lighting device according to image signals. The R light modulated by the R spatial light modulating device 54R enters the cross dichroic prism 55 as a color combining system.

The G light source unit 51G is a light source device for emitting G light. A not-shown heater of the G light source unit 51G as a temperature control unit is provided in the projector housing 59. The G light having passed through the diffusing element 52 and the field lens 53 enters a G spatial light modulating device 54G. The G light source unit 51G, the diffusing element 52, and the field lens 53 constitute a lighting device for supplying light to the G spatial light modulating device 54G. The G spatial light modulating device 54G is a spatial light modulating device, a transmission type liquid crystal display device for modulating G light emitted from the lighting device according to image signals. The G light modulated by the G spatial light modulating device 54G enters the cross dichroic prism 55 via a surface different from the surface to which the R light enters.

The B light source unit 51B is a light source device for emitting B light. A not-shown heater of the B light source unit 51B as a temperature control unit is provided in the projector housing 59. The B light having passed through the diffusing element 52 and the field lens 53 enters a B spatial light modulating device 54B. The B light source unit 51B, the diffusing element 52, and the field lens 53 constitute a lighting device for supplying light to the B spatial light modulating device 54B. The B spatial light modulating device 54B is a spatial light modulating device, a transmission type liquid crystal display device for modulating B light emitted from the lighting device according to image signals. The B light modulated by the B spatial light modulating device 54B enters the cross dichroic prism 55 via a surface different from the surfaces to which the R light and G light enter. The transmission type liquid crystal display device is constituted by high temperature polysilicon (HTPS) TFT liquid crystal panel, for example.

The cross dichroic prism 55 has two dichroic films 56 and 57 disposed substantially orthogonal to each other. The first dichroic film 56 reflects R light and transmits G and B lights. The second dichroic film 57 reflects B light and transmits R and G lights. The cross dichroic prism 55 combines R light, G light, and B light entering from different directions, and releases the combined light toward the projection lens 58. The projection lens 58 projects the light combined by the cross dichroic prism 55 to the screen 60.

When the respective main bodies of the light source units 51R, 51G, and 51B having their light source housing are removed from the projector 50, light emission from the main bodies is reduced to such an extent that the possibility of making bad use of the light source units 51R, 51G, and 51B and using the units 51R, 51G, and 51B for other purpose can be sufficiently decreased. Accordingly, the possibility of making bad use of the light source devices and using the light source devices for other purpose can be sufficiently reduced. The structures of the respective light source units 51R, 51G, and 51B may be similar to the structure of the light source unit 10 in the first embodiment or of any light source units according to the embodiments described herein.

The projector is not limited to the type including the transmission type liquid crystal display device as the spatial light modulating device. The spatial light modulating device may be reflection type liquid crystal display device (liquid crystal on silicon; LCOS), DMD (digital micromirror device), GLV (grating light valve), or other devices. The projector is not limited to the type including the spatial light modulating device for each color light. The projector may have one spatial light modulating device capable of modulating two, three or more color lights. The projector is not limited to the type using the spatial light modulating device. The projector may be a laser scan type projector which uses laser beam emitted from a light source device for scanning using a scanning unit such as galvano-mirror, and displays images on a light receiving surface. The projector may be a slide projector which uses a slide containing image information. The projector may be a so-called rear projector which supplies light to one surface of the screen and displays images to be viewed by the light released from the other surface of the screen.

The light source device according to the invention is applicable to a liquid crystal display as an image display apparatus. The light source device according to the invention may be combined with a light guide plate to provide a lighting device for lighting a liquid crystal panel. In this case, the possibility of making bad use of the light source device and using the light source device for other purpose can be sufficiently reduced similarly to the above embodiments. The light source device according to the invention is applicable to a monitoring device or the like which shoots images of a subject illuminated by light emitted from an electronic device other than image display apparatus such as light source device. The light source device according to the invention is applicable to optical system included in an exposure device for exposure using laser beams, a laser processing device, or other devices.

As obvious from the description herein, the light source device according to the invention is appropriately included in an image display apparatus.

The entire disclosure of Japanese Patent Application No. 2008-001866, filed Jan. 9, 2008 is expressly incorporated by reference herein.

What is claimed is:

1. A light source device, comprising:
    a light source unit configured to emit light;
    a wavelength conversion element configured to convert the wavelength of light emitted from the light source unit
    a light source housing configured to accommodate at least the light source unit and the wavelength conversion element;
    a temperature control unit configured to control temperature of the wavelength conversion element;
    a heat conductive member disposed at the position of the wavelength conversion element on the light source housing to conduct heat between the wavelength conversion element and the temperature control unit; and
    a heat insulator provided around the heat conductive member to reduce conduction of heat,
    wherein the temperature control unit is disposed outside the light source housing.

2. The light source device according to claim 1, wherein the temperature control unit is disposed on a light source fixing member which fixes the light source housing.

3. The light source device according to claim 1, wherein:
    the light source unit configured to emit light having first wavelength;
    the wavelength conversion element configured to convert the wavelength of the light having the first wavelength into light having second wavelength different from the first wavelength and emits the light having the second wavelength; and
    a wavelength selecting unit configured to direct the light having the second wavelength to the outside of the light source housing, and reduces the light having the first wavelength and traveling to the outside of the light source housing.

4. The light source device according to claim 1, further comprising:
    an external resonator configured to resonate light emitted from the light source unit,
    wherein the temperature control unit configured to control temperature of the external resonator.

5. A lighting device, comprising the light source device according to claim 1 to illuminate a light receiving object by light emitted from the light source device.

6. An image display apparatus, comprising the light source device according to claim 1 to display an image by light emitted from the light source device.

* * * * *